United States Patent
Martin (10) Patent No.: US 10,785,714 B2
(45) Date of Patent: *Sep. 22, 2020

(54) COMMUNICATIONS DEVICES AND METHODS FOR SELECTING A WIRELESS ACCESS INTERFACE

(71) Applicant: SONY CORPORATION, Tokyo (JP)

(72) Inventor: Brian Alexander Martin, Basingstoke (GB)

(73) Assignee: SONY CORPORATION, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/133,528

(22) Filed: Sep. 17, 2018

(65) Prior Publication Data

US 2019/0021049 A1 Jan. 17, 2019

Related U.S. Application Data

(63) Continuation of application No. 15/113,691, filed as application No. PCT/EP2014/079339 on Dec. 24, 2014, now Pat. No. 10,091,722.

(30) Foreign Application Priority Data

Feb. 7, 2014 (EP) .................................. 14154396

(51) Int. Cl.
*H04W 48/18* (2009.01)
*H04W 72/10* (2009.01)
(Continued)

(52) U.S. Cl.
CPC .......... *H04W 48/18* (2013.01); *H04B 17/318* (2015.01); *H04L 43/16* (2013.01);
(Continued)

(58) Field of Classification Search
None
See application file for complete search history.

(56) References Cited

U.S. PATENT DOCUMENTS 10,091,722 B2 * 10/2018 Martin .................. H04W 48/18
2004/0077341 A1    4/2004 Chandranmenon
(Continued)

OTHER PUBLICATIONS

"3rd Generation Partnership Project; Technical Specification Group Radio Access Network; Radio Resource Control {RRC}; Protocol specification", 3GPP TS 25.331, V12.0.0, Technical Specification, Release 12, Dec. 2013, 2120 pages.
(Continued)

*Primary Examiner* — Lonnie V Sweet
(74) *Attorney, Agent, or Firm* — Xsensus LLP (57) ABSTRACT

A communications device transmits data to a mobile communications network or receives data from a mobile communications network. The mobile communications network includes plural infrastructure equipment each providing a wireless access interface for the communications device. The wireless access interfaces may have a different frequency but operate in accordance with the same standard or may use different radio access technologies. The communications device selects one of the wireless access interface by generating a signal reception metric for each of the wireless access interfaces provided by the one or more neighbouring infrastructure equipment and each if the wireless access interfaces provided by the selected infrastructure equipment, and selects or reselects one of the wireless access interfaces provided by the one or more neighbouring infrastructure equipment or one of the wireless access interfaces provided by the selected infrastructure equipment in accordance with predetermined criteria based on the generated signal reception metrics.

24 Claims, 6 Drawing Sheets

(51) Int. Cl.
  *H04W 48/20* (2009.01)
  *H04B 17/318* (2015.01)
  *H04L 12/26* (2006.01)
  *H04W 28/02* (2009.01)
  *H04W 36/00* (2009.01)
  *H04W 48/12* (2009.01)
  *H04W 88/06* (2009.01)

(52) U.S. Cl.
  CPC ....... *H04W 28/0268* (2013.01); *H04W 48/20* (2013.01); *H04W 72/10* (2013.01); *H04W 36/0061* (2013.01); *H04W 48/12* (2013.01); *H04W 88/06* (2013.01); *Y02D 70/1242* (2018.01); *Y02D 70/1262* (2018.01); *Y02D 70/142* (2018.01); *Y02D 70/146* (2018.01); *Y02D 70/21* (2018.01)

(56) References Cited

U.S. PATENT DOCUMENTS

| | | | |
|---|---|---|---|
| 2011/0310821 A1* | 12/2011 | Kim | H04B 7/15542 370/329 |
| 2011/0319076 A1* | 12/2011 | Ramasamy | H04W 48/16 455/434 |
| 2013/0084858 A1 | 4/2013 | Ramasamy et al. | |
| 2014/0112310 A1* | 4/2014 | Teyeb | H04W 36/30 370/332 |
| 2015/0358838 A1 | 12/2015 | Wei | |

OTHER PUBLICATIONS

International Search Report dated Mar. 31, 2015 in PCT/EP2014/079339 filed Dec. 24, 2014.

"New WI: Low cost & enhanced coverage MTC UE for LTE", Vodafone, 3GPP TSG RAN meeting #60, RP-130848, Jun. 10-14, 2013, 5 pages.
"Consideration of mobility aspects for and MTC enhanced coverage mode operation", Vodafone Group, 3GPP TSG RAN WG2 #85, R2-140700, Feb. 10-14, 2014, 2 pages.
"Cell selection and reselection in coverage enhancement", Huawei, HiSilicon, 3GPP TSG RAN WG2 Meeting #85, R2-140327, Feb. 10-14, 2014, 3 pages.
"Enhanced Coverage Issues", Sony, 3GPP TSG-RAN WG2 Meeting #85, R2-140369, Feb. 10-14, 2014, 5 pages.
"3 u Generation Partnership Project; Technical Specification Group Radio Access Network; Evolved Universal Terrestrial Radio Access (E-UTRA); User Equipment (UE) procedures in idle mode", 3GPP TS 36.304, V11.6.0, Technical Specification, Release 11, Dec. 2013, 34 pages.
Harri Holma et al., "L TE for UMTS OFDMA and SC-FDMA Based Radio Access", Wiley, IBN 978-0-470-99401-6, 2009, pp. 25-27.
"Discussion on mobility support for Low Complexity MTC UEs and MTC coverage enhancement", CATT, 3GPP TSG RAN WG2 Meeting #84, R2-134040, Nov. 11-15, 2013, 4 pages.
"Consideration on idle mode MTC UE in enhanced coverage", Alcatel-Lucent Shanghai Bell, Alcatel-Lucent, 3GPP TSG-WG RAN2#85, R2-140729, Feb. 10-14, 2014, 3 pages.
"Enhanced Coverage Mobility Issues", Sony, 3GPP TSG-RAN WG2 Meeting #84, R2-133821, Nov. 11-15, 2013, 4 pages.
"3rd Generation Partnership Project; Technical Specification Group Radio Access Network; Study on provision of low-cost MTC UEs based on L TE", 3GPP TR 36.888, V2.1.0, Technical Report, Release 12, May 2013, 57 pages.
"On mobility support for Low Complexity MTC UEs and MTC coverage enhancement", RAN1, 3GPP TSG RAN WG2 Meeting #84, R2-133758, Nov. 11-15, 2013, 2 pages.
"Enhanced Coverage Issues", Sony, 3GPP TSG-RAN WG2 Meeting #85, R2-140825, Feb. 10-14, 2014, 8 pages.
Office Action dated Mar. 10, 2020, issued in corresponding European Patent Application No. 17180521.1, 12 pages.

* cited by examiner

COMMUNICATIONS DEVICES AND METHODS FOR SELECTING A WIRELESS ACCESS INTERFACE

CROSS-REFERENCE TO RELATED APPLICATIONS

The present application is a Continuation of U.S. application Ser. No. 15/113,691, filed Jul. 22, 2016, which is based on PCT filing PCT/EP204/079339 filed Dec. 24, 2014, and claims priority to European Patent Application 1415396.7, filed in the European Patent Office on Feb. 7, 2014, the entire contents of each of which being incorporated herein by reference.

TECHNICAL FIELD OF THE DISCLOSURE

The present disclosure relates to communications devices and methods for communicating data using communications devices, and in particular to communications devices which are configured to perform device-to-device communications.

BACKGROUND OF THE DISCLOSURE

Third and fourth generation mobile telecommunication systems, such as those based on the 3GPP defined UMTS and Long Term Evolution (LTE) architecture are able to support more sophisticated services than simple voice and messaging services offered by previous generations of mobile telecommunication systems.

For example, with the improved radio interface and enhanced data rates provided by LTE systems, a user is able to enjoy high data rate applications such as mobile video streaming and mobile video conferencing that would previously only have been available via a fixed line data connection. The demand to deploy third and fourth generation networks is therefore strong and the coverage area of these networks, i.e. geographic locations where access to the networks is possible, is expected to increase rapidly.

The anticipated widespread deployment of third and fourth generation networks has led to the parallel development of a class of devices and applications which, rather than taking advantage of the high data rates available, instead take advantage of the robust radio interface and increasing ubiquity of the coverage area. Examples include so-called machine type communication (MTC) applications, which are typified by semi-autonomous or autonomous wireless communication devices (i.e. MTC devices) communicating small amounts of data on a relatively infrequent basis. Examples include so-called smart meters which, for example, are located in a customer's house and periodically transmit information back to a central MTC server data relating to the customers consumption of a utility such as gas, water, electricity and so on. Other examples include medical devices and automotive applications in which measurement data is gathered from sensors on a vehicle and transmitted via a mobile communications network to a server attached to the network.

Unlike a conventional third or fourth generation communications device such as a smartphone, an MTC-type terminal is preferably relatively simple and inexpensive, having a reduced capability. It is usually justified to include complex transceivers in a smartphone because a smartphone will typically require a powerful processor to perform typical smartphone type functions. However, a desire to use relatively inexpensive and less complex devices to communicate using LTE type networks may result in a receiver of such a device to be less sensitive to detect and to recover data from received signals or a transmitter may be less powerful. Furthermore, MTC devices may deployed in locations where it may be more difficult for radio signals to reach the device, for example, in a situation in which a communications device such as a smart meter is deployed in the basement of a house.

In order to improve a likelihood that radio signals may be received by a low cost communications device or from a low cost communications device, it has been proposed to deploy a so called extended coverage cell or an enhanced wireless access interface. Cell enhancement or extension is a technique which is being proposed for example for LTE Standards which provides an arrangement of effectively extending a coverage area of a base station or eNodeB to reach a communications device which may be otherwise out of a coverage area. Coverage extension is achieved by employing a wireless access interface enhancement techniques such as boosting the power of certain signals or transmitting control signals or data repeatedly, effectively a coverage area of the base station can be extended.

In a scenario in which a communications device must select or reselect a wireless access interface provided by a base station to form a cell of a mobile communications system, it will be appreciated that there may be occasions when it is appropriate to select an extended coverage cell, whereas in other situations the extended coverage cell may not provide an optimum use of communications resources.

SUMMARY OF THE DISCLOSURE

According to a first aspect there is provided a method of selecting a wireless access interaface for transmitting data from a communications device to a mobile communications network or receiving data from a mobile communications network at a communications device. The mobile communications network includes a plurality of infrastructure equipment each providing one or more wireless access interface for the communications device. The wireless access interfaces may be wireless access interfaces operating in accordance with the same transceiver techniques (same radio interface standard) on the same or different frequencies or different radio access technologies. The wireless access interfaces may be provided by different infrastructure equipment and therefore different cells of the mobile communications network. The method comprises selecting, by the communications device, one of the wireless access interfaces of the infrastructure equipment as a serving wireless access interface. One or more of the selected infrastructure equipment or one or more neighbouring infrastructure equipment provide an enhanced wireless access interface providing a facility for transmitting or receiving the signals at a lower power relative to a wireless access interface which is not enhanced. The selecting the one of the wireless access interface comprises generating a signal reception metric for each of the wireless access interfaces provided by the one or more neighbouring infrastructure equipment and for each of the wireless access interfaces provided by the the selected infrastructure equipment, and selecting or reselecting one of the wireless access interfaces provided by the one or more neighbouring infrastructure equipment or one of the wireless access interfaces provided by the selected infrastructure equipment in accordance with predetermined criteria based on the generated signal reception metrics.

Embodiments of the present technique provide an arrangement in which a communications device selects a wireless access interface or cell, which may include an enhanced wireless access interface providing an extended cell coverage by treating the enhanced wireless access interface as if this were another cell, even if the enhanced wireless access interface is provided by the same infrastructure equipment a not enhanced wireless access interface. In some examples the enhanced wireless access interface may be provided by the selected infrastructure equipment so that measurements are performed of the enhanced wireless access interface and the serving wireless access interface from the same cell and evaluated in dependently for selection in accordance with the predetermined criteria.

Various further aspects and features of the present disclosure are defined in the appended claims and include a communications device, a method of receiving data using a communications device, a mobile communications network, an infrastructure equipment and a method of transmitting data from a mobile communications network.

BRIEF DESCRIPTION OF DRAWINGS

Embodiments of the present disclosure will now be described by way of example only with reference to the accompanying drawings wherein like parts are provided with corresponding reference numerals and in which.

DESCRIPTION OF EXAMPLE EMBODIMENTS

Example of an LTE System

Figure 1:
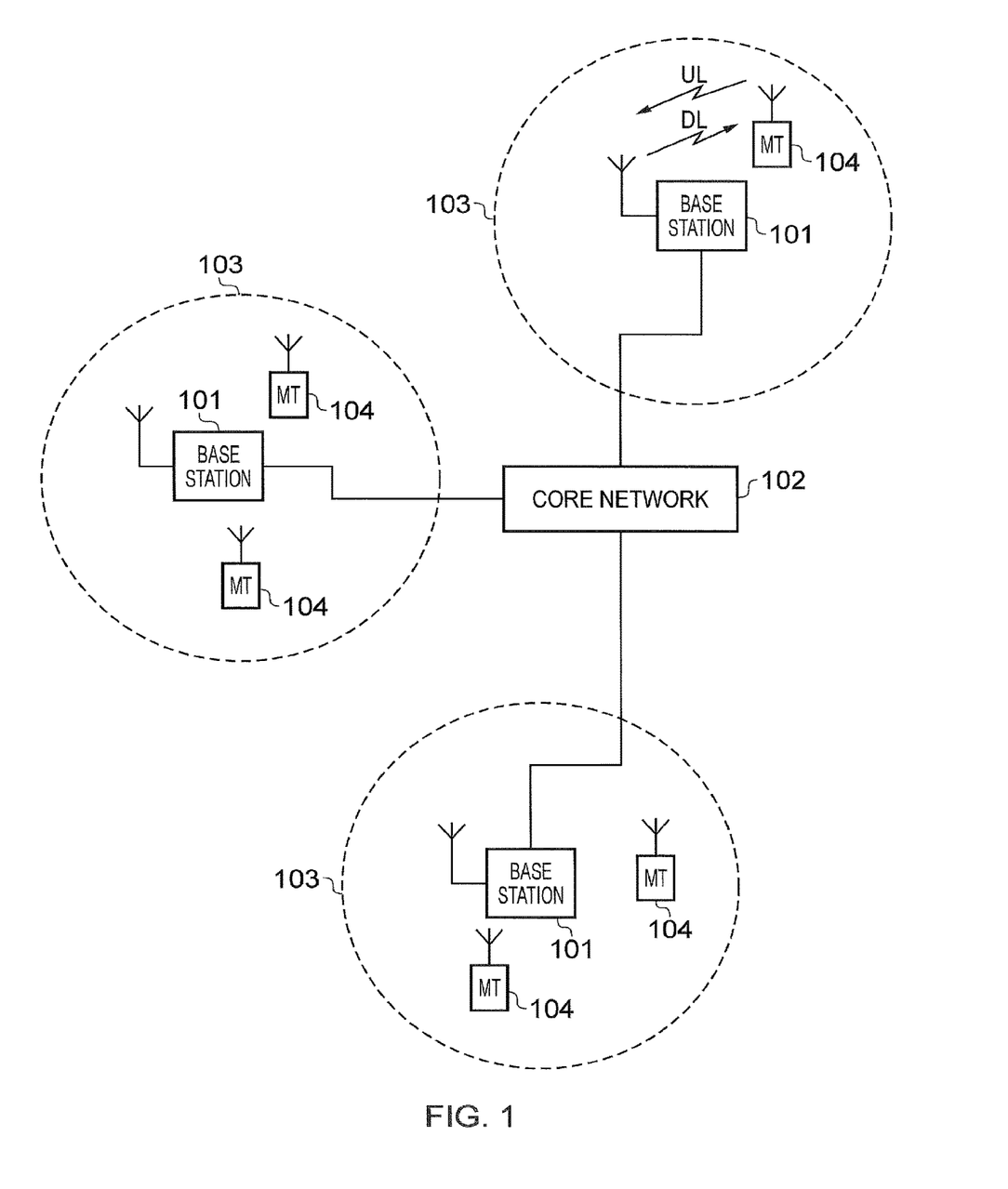
FIG. 1 provides a schematic diagram illustrating an example of a conventional mobile telecommunication network.

FIG. 1 provides a schematic diagram illustrating some basic functionality of a conventional mobile telecommunications network, using for example a 3GPP defined UMTS and/or Long Term Evolution (LTE) architecture.

The network includes a plurality of base stations 101 connected to a core network 102. Each base station provides a coverage area 103 (i.e. a cell) within which data can be communicated to and from communications devices (also referred to as mobile terminals, MT or User equipment, UE) 104. Data is transmitted from base stations 101 to communications devices 104 within their respective coverage areas 103 via a radio downlink Data is transmitted from communications devices 104 to the base stations 101 via a radio uplink. The core network 102 routes data to and from the terminal devices 104 via the respective base stations 101 and provides functions such as authentication, mobility management, charging and so on.

Mobile communications systems such as those arranged in accordance with the 3GPP defined Long Term Evolution (LTE) architecture use an orthogonal frequency division multiplex (OFDM) based interface for the radio downlink (so-called OFDMA) and the radio uplink (so-called SC-FDMA). Further information on the structure and functioning of the physical channels of LTE systems can be found in [6].

UE Cell Selection

In mobile communication systems it is conventional for a mobile communications device (UE) to select a base station or eNodeB through which to transmit and receive signals. For mobile communications systems such as LTE, for example, a UE transmits data to and from an eNodeB of a mobile communications network and hands over between different eNodeB's throughout the mobile radio network as the UE moves in and out of a coverage area provided by the eNodeBs. Within the coverage area the signal strength of transmitted and received radio signals are sufficient detectable by the eNodeB and the UE respectively and accordingly the UE can transmit and receive data to or from that eNodeB. The UE transmits and receives data from the eNodeB when in an active mode. However, when in an idle mode then the UE is responsible for selecting which eNodeB and therefore cell to attached to. As such when the UE enters an active mode, for example in order to receive data if the network receives data for transmission to the UE or if the UE wishes to transmit the data to the mobile communications network in which case.

The present disclosure concerns techniques for the UE to select an appropriate access point or base station such as an eNodeB to attach to in order to transmit and receive radio signals via that eNodeB. However, the base station or access point to which the UE can attach does not necessarily conform to a particular radio access standard. Therefore, the base station or access point may not be an eNodeB. Therefore, for some examples the UE may attach to a WiFi access point or WiMax or other radio access technology to transmit and receive signals from a mobile communications network. As will be explained shortly a complication arises in selecting an appropriate base station or access point where for example an LTE system deploys an enhanced carrier in which the wireless access interface is configured to transmit and to receive signals to a UE at a lower transmitted and received signal power. Thus, for example, by repeating some control signals transmitted by the eNodeB on the downlink, effectively an extension of the coverage of the cell can be achieved.

Figure 2:
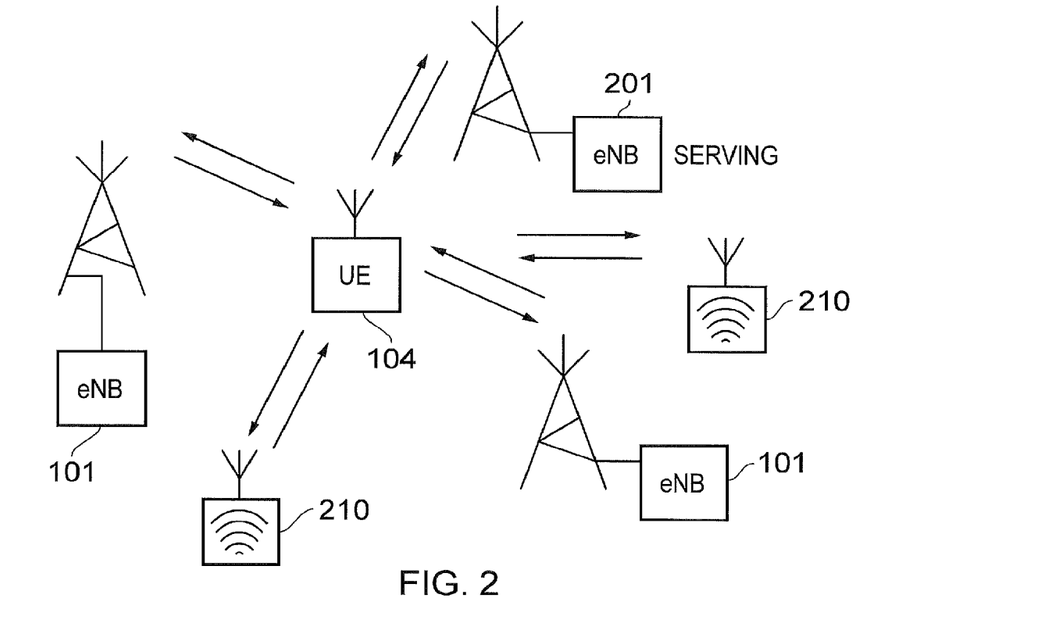
FIG. 2 provides a schematic diagram illustrating a communications device (UE) communicating with different radio access interfaces according to a heterogeneous radio access network.

FIG. 2 illustrates a heterogeneous arrangement of wireless access interfaces which a UE could attach to. As shown in FIG. 2 a UE 104 can transmit and receive signals to the eNodeB's 101 within a coverage area provided by each of the eNodeB's 101. For the example shown in FIG. 2, the UE 104 is currently attached to an eNodeB 201 which forms a serving eNodeB or serving cell for the UE 101. Also shown in FIG. 2 are two access points 210 which for example operate to provide a wireless access interface in accordance with the WiFi standard. Thus the UE 104 may handover or reattach to one of the WiFi access points 210 by performing a selection process and selecting the wireless access points 210 instead of the serving eNodeB 201.

Figure 3:
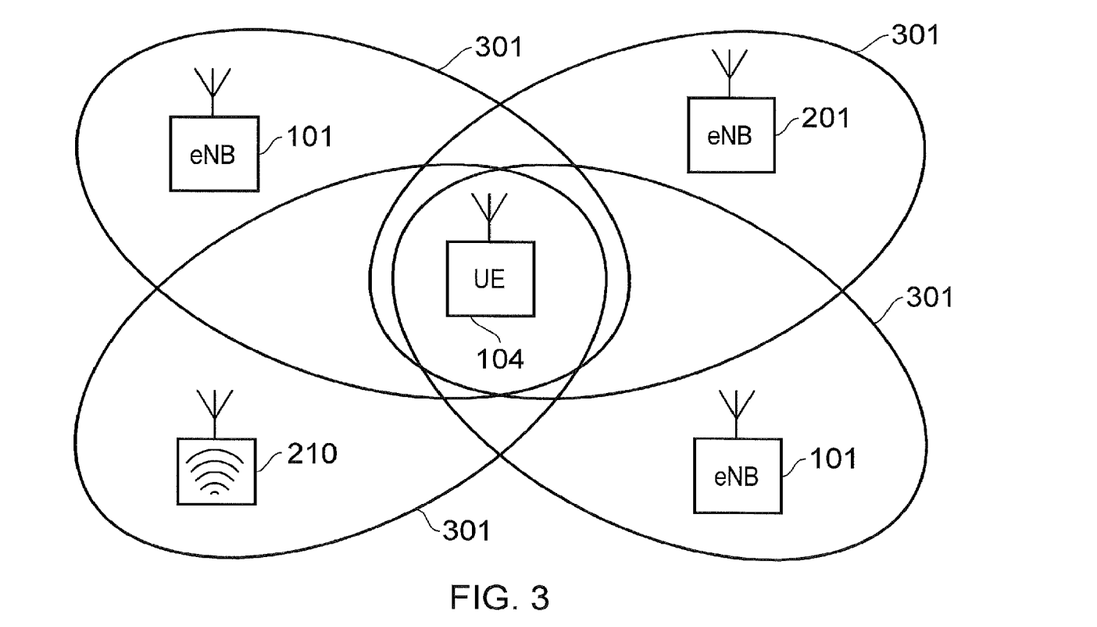
FIG. 3 provides a schematic diagram illustrating different coverage areas of different base stations and access points of the heterogeneous radio access network of FIG. 2.

As shown in FIG. 3, each of the base stations or access points shown in FIG. 2 has a coverage area which can be represented as a boundary line 301 which surrounds each of the eNodeB's 201, 101 or the access point 210. The boundary line 301 represents a illustrative way of explaining a coverage area provided respectively by each of the base stations (eNodeBs) or access points shown in FIG. 2 within which the UE can transmit and receive signals with that base station or access point to the extent that data can be transmitted or received. As shown in FIG. 3, the UE 104 may be within a coverage area 301 of more than of the eNodeB's 201, 101 or the access point 210 and therefore must select which of those base stations or access points to attach to for transmission and reception of signals including access stratum and non-access stratum data.

Coverage Extension or Enhancement

Figure 4:
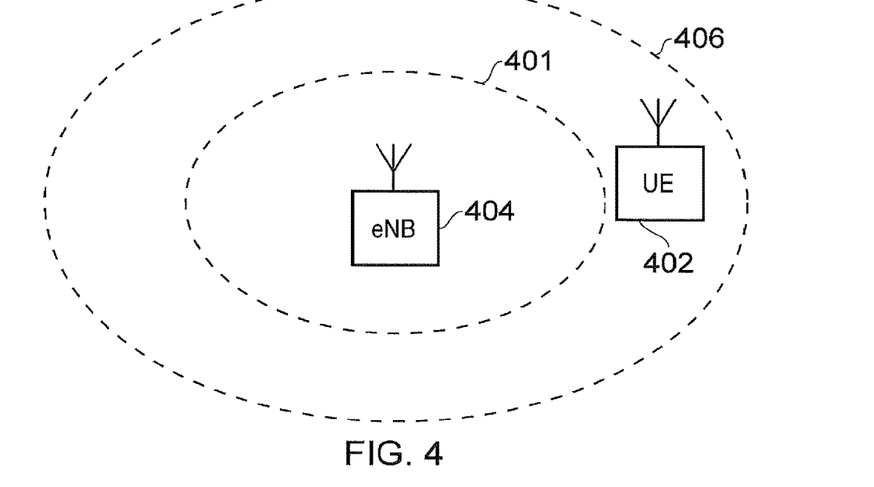
FIG. 4 provides a schematic diagram illustrating an effect of providing an enhanced wireless access interface to an infrastructure equipment which also includes a not enhanced wireless access interface.

Coverage enhancement or extension is a technique which is being proposed for LTE Standards which provides an arrangement of effectively extending a coverage area of a base station or eNodeB to reach UE's which may be otherwise out of a coverage area. An example application is where a UE such as a machine to machine device is disposed in a basement or in an environment in which radio signals may find it difficult to penetrate and therefore the UE might be outside of the coverage area of the eNodeB. Therefore, for example in FIG. 4, a conventional coverage area is represented by a dash line 401 whereas UE 402 is outside of the coverage area of the eNodeB 404. However, by employing a wireless access interface enhancement techniques such as boosting the power of certain signals or transmitting control signals or data repeatedly, effectively a coverage area of the eNodeB 404 can be extended to a second boundary line 406. Accordingly, the UE 402 is then within the coverage area of the enhanced wireless access interface provided by the eNodeB 404.

Figure 5:
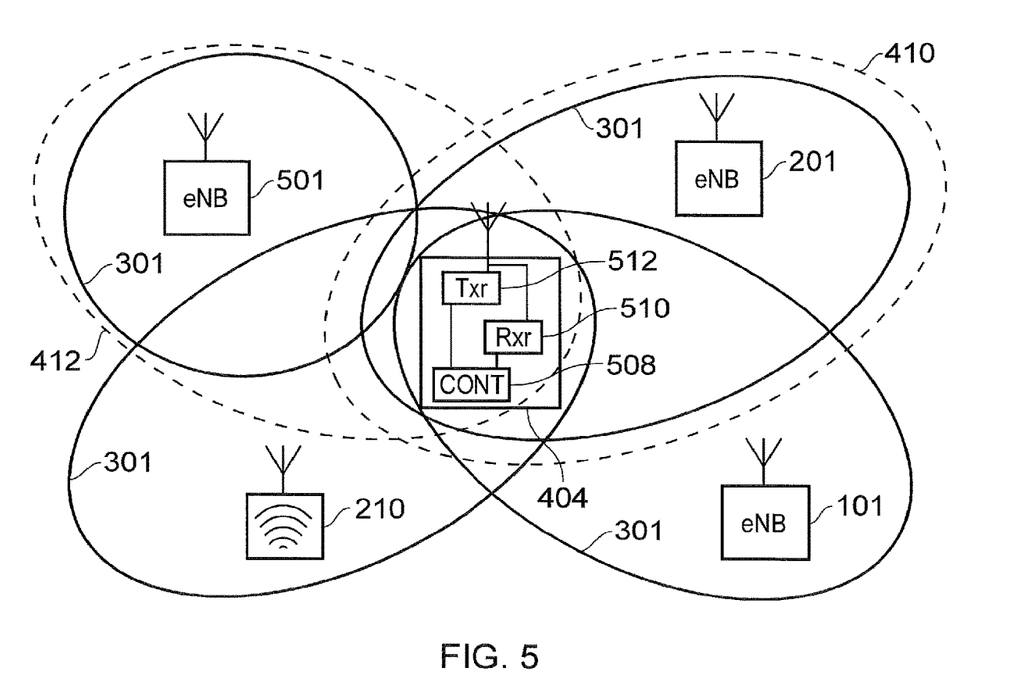
FIG. 5 provides a schematic block diagram of a communications device (UE) performing a selection process according to the present technique ion which one or more of a neighbouring infrastructure equipment or a serving infrastructure equipment may provide an enhanced wireless access interface.

FIG. 5 shows an example illustration of the arrangement based on FIG. 3 in which the UE is within a coverage area of several base stations or access points such as the eNodeB's 201, 101 and the WiFi access point 210. However, as shown by the dashed line 410 the serving eNodeB 201 also provides an enhanced wireless access interface and therefore the coverage area of the serving eNodeB is extended to boundary line 410. A corresponding example is shown by the eNodeB 501 which also includes an enhanced wireless access interface as well as conventional wireless access interface. For the enhanced wireless access interface the coverage is extended to a dashed line 412. The dashed line therefore extends the coverage area provided by the eNodeB 501. The UE 104 is therefore able to communicate with the eNodeB 501 via the enhanced wireless access interface but not the wireless access interface which has a closer boundary 301 which falls before the UE 104.

As shown in FIG. 5 the UE 404 includes a controller 508 which is arranged to control a receiver 510 and a transmitter 512 in accordance with the operations of the present technique defined in the following paragraphs.

Currently the low cost and enhanced coverage work item is being discussed in 3GPP, for example in [1] One of the two main objectives of the enhancement of wireless access interface is as follows:

Provide a relative LTE coverage improvement—corresponding to 15 dB for FDD—for the UE category/type defined above and other UEs operating delay tolerant MTC applications with respect to their respective nominal coverage.

Specify the following techniques (which shall be applicable for both FDD and TDD) to achieve this:

Simplification of PHICH and PCFICH functionality or alternative mechanism to PHICH and PCFICH functionality so that coverage limited UE is not constrained by PHICH and PCFICH physical channels A mechanism(s) to support scalability of spectral efficiency impact for coverage improvement by identifying UE requiring additional coverage improvement and informing eNB the amount of coverage the UE requires.

Repetition/TTI bundling and extension to PSD boosting for applicable channels/signals identified during study phase.

A relaxed requirement for "probability of missed detection" for PRACH.

The present technique concerns a situation in which a UE performs a selection of a base station or access point to which it should attach for transmitting and receiving signals. In accordance with some deployments of mobile communications systems such as LTE, there is the possibility of transmitting via different frequencies within an LTE network on different frequency divided carriers or using different radio access technologies (RAT). Therefore in the following description the term "wireless access interface" is used to encompass both a different radio access technology as well as a different wireless access interface provided by a different base station or access point or a wireless access point on a different frequency. Those familiar with LTE will understand that the different frequencies and radio access technologies are provided with a different priority and as part of the cell reselection process the UE is biased to select a wireless access interface with a higher priority in accordance with operator policy. This is achieved by transmitting for example the different priorities for the different wireless access interfaces to the UE from the network. However, because a wireless access interface, which has been coverage extended provides a signal reception metric which is biased to a lower value because of the coverage extension of the cell, a UE may be more likely to select an enhanced wireless access interface providing a coverage extension cell whereas a conventional wireless access interface may also be selectable. Since the data rates and facilities provided by an extended wireless access interface may be lower than that provided by a wireless access interface in a conventional form which is not enhanced or extended then the UE may inadvertently always select the enhanced wireless access interface whereas it should continue or select a conventional wireless access interface. This problem will be explained in more detail in the following paragraphs.

As background information references [2], [3], [4] and [5] provide previous proposals concerning the selection of the enhanced wireless access interface.

According to one example proposal a minimum suitability level is broadcast by the network in order that the UE may camp on a cell which has a lower than measured power/interference (RSRP/RSRQ) at the UE. This is possible due to the enhanced coverage operation, which is likely to be achieved mainly by repetition and combining of uplink and downlink data. However, it is also desirable to define a method for prioritising reselection to cells which are suitable under normal operation, over those which require coverage enhancements to be suitable. The main reason for this, which is perhaps not clear from the above references, is that it is possible that a UE which is currently using a cell in normal operation (i.e. non-enhanced coverage) will reselect to another cell on a higher priority frequency that meets the criteria only due to the lower suitability level. Obviously, it is beneficial for the UE to be using a cell in relatively good coverage conditions rather than poor (and enhanced) coverage. The current cell reselection criteria ensures this in normal circumstances, however does not take into account potential coverage enhancements.

Cell Selection Process

Part of the cell selection process includes a procedure for performing a cell measurement procedure. The current cell reselection measurement rules, and the cell reselection criteria are defined in TS36.304 [5]. According to an example known selection process a UE may camp (select or reselect) a base station or cell only when the suitability criteria S (cell selection criteria) is met. One example of a cell suitability criteria is provided in TS 36.304, which is summarized as follows:

The cell selection criterion S is fulfilled when:

$$Srxlev > 0 \text{ AND}$$

$$Squal > 0$$

where:

$$Srxlev = Q_{rxlevmeas} - (Q_{rxlevmin} + Q_{rxlevminoffset}) - Pcompensation$$

$$Squal = Q_{qualmeas} - (Q_{qualmin} + Q_{qualminoffset})$$

| | |
|---|---|
| Srxlev | Cell selection RX level value (dB) |
| Squal | Cell selection quality value (dB) |
| $Q_{rxlevmeas}$ | Measured cell RX level value (RSRP) |
| $Q_{qualmeas}$ | Measured cell quality value (RSRQ) |
| $Q_{rxlevmin}$ | Minimum required RX level in the cell (dBm) |
| $Q_{qualmin}$ | Minimum required quality level in the cell (dB) |
| $Q_{rxlevminoffset}$ | Offset to the signalled $Q_{rxlevmin}$ taken into account in the Srxlev evaluation as a result of a periodic search for a higher priority PLMN while camped normally in a VPLMN [5] |
| $Q_{qualminoffset}$ | Offset to the signalled $Q_{qualmin}$ taken into account in the Squal evaluation as a result of a periodic search for a higher priority PLMN while camped normally in a VPLMN [5] |
| Pcompensation | $\max(P_{EMAX} - P_{PowerClass}, 0)$ (dB) |
| $P_{EMAX}$ | Maximum TX power level an UE may use when transmitting on the uplink in the cell (dBm) defined as $P_{EMAX}$ in [TS 36.101] |
| $P_{PowerClass}$ | Maximum RF output power of the UE (dBm) according to the UE power class as defined in [TS 36.101] |

Since cells supporting coverage enhancement need to support UEs operating at lower powers (E.g. 15 dB lower downlink and/or uplink power) then the minimum RX level (Qrxlevmin) and quality (Qqualmin) criteria need to be updated to be used only for UEs using the cell in enhanced coverage mode.

Currently the cell selection algorithm used by a UE is left mainly to implementation, the specification just requires that when the UE finds a suitable cell and it is the best cell on the frequency, then that cell will be selected.

One very simple implementation will scan all the supported frequencies in order and will choose a cell on the first frequency, which it finds a suitable cell. More intelligent implementations may use stored information to determine the order which frequencies are searched. For cell selection, one of two approaches can be used 1) The UE may first search for a suitable cell to camp on, without coverage enhancement, then will try for coverage enhancement cells.
2) No changes—UE just camps on a cell if it is suitable (even if in coverage enhancement mode)

The problem with (1) is that it can take a long time to scan all the possible supported frequencies before determining the UE should camp on a cell using coverage enhanced mode. This can drain UE power as well as delay UE obtaining service.

For the solution (2) the UE may select a coverage enhancement cell before a cell with better coverage, if it using a relatively simple cell selection algorithm. However more intelligent algorithms may overcome this problem. However the UE will then start using the power saving rules defined for cell reselection. If the cell reselection rules work correctly then the UE will find the normal coverage cell relatively quickly.

Cell Reselection Measurement Rules

The UE applies power saving rules when determining what measurements to perform for cell reselection. The UE shall search for higher priority frequencies relatively infrequently when the current cell measurements are above a threshold (known as service based measurements in order to obtain a higher priority frequency which may provide better service). If the current cell measurement drops below a threshold then the UE additionally measures equal and lower priority frequencies, as well as performing these much quicker according to tighter requirements, which is also known as coverage based measurements, because measuring more quickly it is more likely that a coverage area may be kept.

As previously made proposal is provided in TS36.304 [1], which provides rules to be used by the UE to limit needed measurements:

If the serving cell fulfils $Srxlev > S_{IntraSearchP}$ and $Squal > S_{IntraSearchQ}$, the UE may choose not to perform intra-frequency measurements.

Otherwise, the UE shall perform intra-frequency measurements.

The UE shall apply the following rules for E-UTRAN inter-frequencies and inter-RAT frequencies which are indicated in system information and for which the UE has priority:

For an E-UTRAN inter-frequency or inter-RAT frequency with a reselection priority higher than the reselection priority of the current E-UTRA frequency the UE shall perform measurements of higher priority E-UTRAN inter-frequency or inter-RAT frequencies.

For an E-UTRAN inter-frequency with an equal or lower reselection priority than the reselection priority of the current E-UTRA frequency and for inter-RAT frequency with lower reselection priority than the reselection priority of the current E-UTRAN frequency:

If the serving cell fulfils $Srxlev > S_{nonIntraSearchP}$ and $Squal > S_{nonIntraSearchQ}$, the UE may choose not to perform measurements of E-UTRAN inter-frequencies or inter-RAT frequency cells of equal or lower priority.

Otherwise, the UE shall perform measurements of E-UTRAN inter-frequencies or inter-RAT frequency cells of equal or lower priority.

Cell Reselection Criteria

In addition to the measurement rules, a number of reselection criteria are given. In summary, the UE shall reselect to a higher priority frequency, if that frequency meets a threshold, and regardless of the current cell measurements. For lower priority frequencies the UE shall reselect if that target frequency meets a threshold, but only if the serving cell is below another threshold (mirroring the measurement rules). For equal priority frequencies the UE performs ranking and selects the highest ranked cell across the frequencies.

An example of a known proposal from TS36.304 [1] for cell reselection to a cell on a higher priority E-UTRAN frequency or inter-RAT frequency than the serving frequency is performed if A cell of a higher priority RAT/frequency fulfils Srxlev>Thresh$_{X,HighP}$ during a time interval Treselection$_{RAT}$;

cell reselection to a cell on a lower priority E-UTRAN frequency or inter-RAT frequency than the serving frequency shall be performed if The serving cell fulfils Srxlev<Thresh$_{Serving,LowP}$ and a cell of a lower priority RAT/frequency fulfils Srxlev>Thresh$_{X,LowP}$ during a time interval Treselection$_{RAT}$;

Intra-Frequency and Equal Priority Inter-Frequency Cell Reselection Criteria

The cell-ranking criterion $R_s$ for serving cell and $R_n$ for neighbouring cells is defined by:

$$R_s = Q_{meas,s} + Q_{Hyst}$$

$$R_n = Q_{meas,n} - Q_{offset}$$

where:

| | |
|---|---|
| $Q_{meas}$ | RSRP measurement quantity used in cell reselections. |
| Qoffset | For intra-frequency: Equals to Qoffset$_{s,n}$, if Qoffset$_{s,n}$ is valid, otherwise this equals to zero. |
| | For inter-frequency: Equals to Qoffset$_{s,n}$ plus Qoffset$_{frequency}$, if Qoffset$_{s,n}$ is valid, otherwise this equals to Qoffset$_{frequency}$. |

The cells shall be ranked according to the R criteria specified above, deriving $Q_{meas,n}$ and $Q_{meas,s}$ and calculating the R values using averaged RSRP results.

If a cell is ranked as the best cell the UE shall perform cell reselection to that cell.

Figure 6:
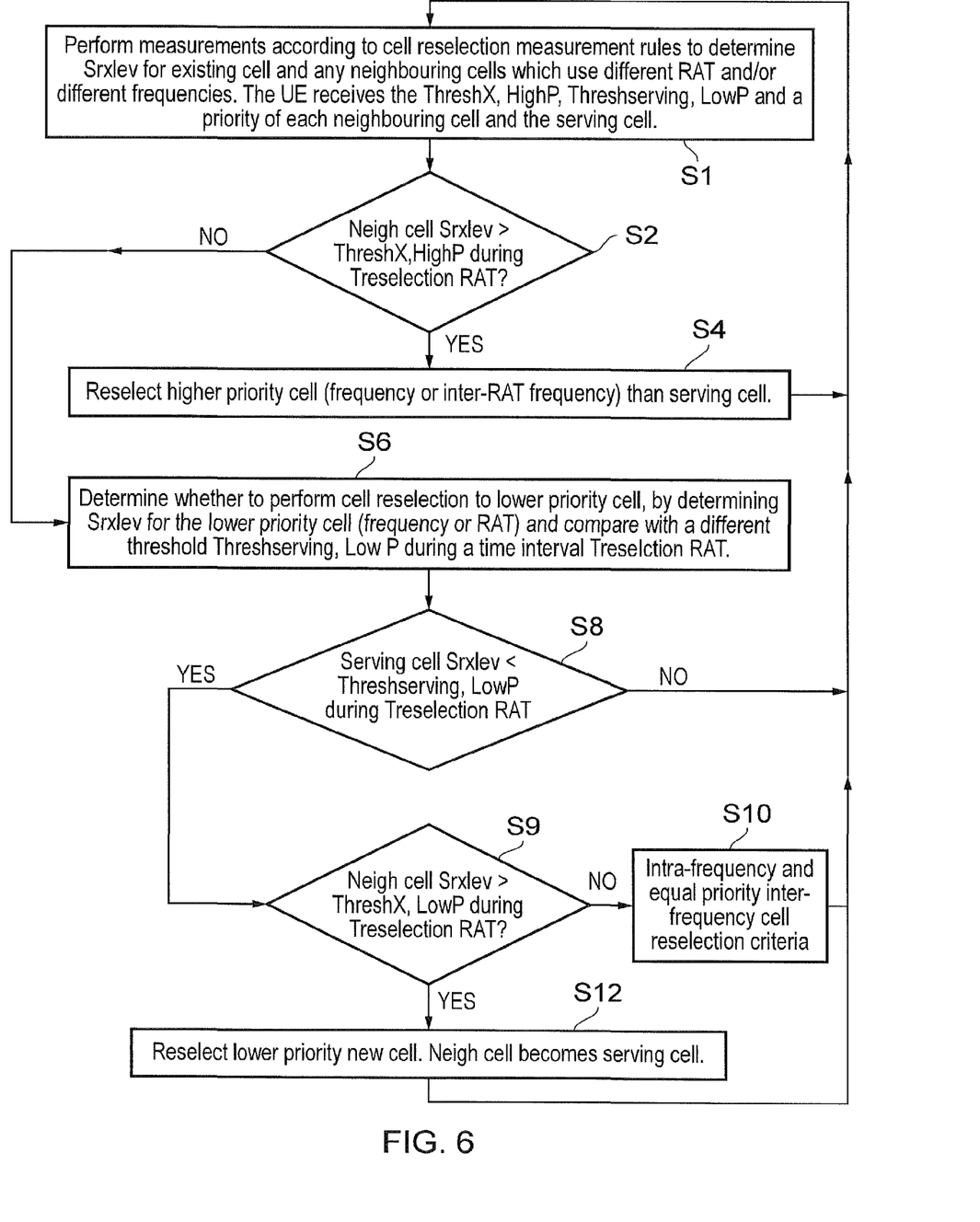
FIG. 6 provides an example flow diagram providing an illustration of a previously proposed process for performing cell reselection.

According to the above explanation, a previously proposed arrangement for the UE to select a cell or wireless access interface is presented in FIG. 6. FIG. 6 provides a flow diagram for one example implementation of performing cell reselection, which is summarised as follows:

S1: The UE performs measurements according to cell reselection measurement rules such as determining the parameter Srxlev identified above, which provides a signal reception metric for existing cells and any neighbouring cells which use different radio access technologies (RAT) and or different frequencies. Effectively these are different wireless access interfaces in accordance with the expressions used above. In some examples, the UE is configured to measure the signal reception metric (Srxlev or Squal) for higher priority wireless access interfaces on an ongoing basis, and only after there are no higher priority wireless access interfaces with a signal reception metric greater than a threshold, does the UE measure the signal reception metric for lower priority wireless access interfaces. The UE receives a first threshold (TheshX,HighP) which is the threshold for changing to a higher priority base station and receives a second threshold which is associated with reselecting a lower priority wireless access interface. The UE also receives a priority level for each of the wireless access interfaces that is for the neighbouring infrastructure equipment and the serving of an infrastructure equipment.

S2: If the signal reception metric (Srxlev, Squal) is above the first threshold (TheshX,HighP) associated with switching to a higher priority wireless access interface then processing proceeds to step S4 otherwise processing proceeds to S6.

S4: If the signal reception metric (Srxlev, Squal) for a higher priority wireless access interface is above the first threshold (TheshX,HighP) then the UE switches by reselecting the higher priority cell which becomes the new serving cell.

S6: If the signal reception metric (Srxlev, Squal) is below the first threshold then the UE begins to perform measurements of any wireless access interface including neighbouring cells which have a lower priority or an equal priority. The UE therefore determines the signal reception metric (Srxlev, Squal) for lower priority cells and compares these with the second threshold (Theshserving,LowP) for selecting the lower priority cells.

S8: If the serving cell has a signal reception metric (Srxlev, Squal), which is below the threshold (Theshserving, LowP) for selecting a lower priority wireless access interface then processing proceeds to S9. Otherwise the processing proceeds back to step S1 to perform measurements again.

S9: If the measured signal reception metric (Srxlev, Squal) for any other wireless access interface for a neighbouring cell is above the third threshold (TheshX,LowP) for selecting a lower priority cell then processing proceeds to step S12. Otherwise processing proceeds to step S10, although processing according to step S10 may in other illustrations occur in parallel or even before S9.

S10: If the wireless access interfaces are of equal priority then the UE performs a ranking of the relative order of priority of the wireless access interfaces, which is may select as mentioned above. Processing then proceeds to step S1.

S12: If the signal reception metric (Srxlev, Squal) is above the third threshold (TheshX,LowP) then the UE selects the lower priority cell as its new cell and the neighbouring cell becomes a serving cell.

Cell Reselection with Enhanced Wireless Access Interface (Cell)

As will be appreciated for the explanation above the flow diagram for selecting a different cell or a wireless access interface is based on an arrangement in which the serving and the neighbouring cells do not include an enhanced wireless access interface which may exist either in a neighbouring cell or the serving cell in addition to a conventional wireless access interface. Therefore the present technique has been devised as a way of selecting the enhanced wireless access interface only where the signal strength or coverage provided by wireless access interface, which is not enhanced i.e. a conventional wireless access interface is not selected.

The problem is that the absolute cell reselection criteria (for inter-freq reselection to higher or lower priority frequencies) uses the measurement quantity which is compared against the thresholds is the same criteria used for cell selection criteria and which is derived from the minimum suitability levels:

$$Srxlev = Q_{rxlevmeas} - (Q_{rxlevmin} + Q_{rxlevminoffset}) - Pcompensation$$

$$Squal = Q_{qualmeas} - (Q_{qualmin} - Q_{qualminoffset})$$

This means that when the Qrxlevmin or Qqualmin is set to a lower value in order to extend coverage, it also has the effect of making Srxlev higher. As such, the reselection thresholds which are set for normal UEs can be reached more easily. This causes two problems:

1) Cell reselection from good coverage to bad coverage: The UE may be camped on a cell which is not using enhanced coverage *(either because cell does not support this, or cell level is good enough that this mode is not enabled). The UE will be periodically measuring for higher priority frequencies. The UE may detect a cell on a higher priority frequency that would not normally meet the cell reselection criteria, however due to the modified Srxlev calculated with the modified Qrxlevmin, the cell reselection criteria is met, meaning the UE reselects from a good coverage cell to a cell which can operate only with coverage enhancements.

2) Preventing reselection from bad coverage to good coverage: Once the UE has camped on the enhanced coverage cell, the UE will not perform inter-frequency measurements on equal or lower priority frequencies (since modified Srxlev means measurements are not required), or will not reselect even if measurements are done (since modified Srxlev means the serving cell quality is still above the threshold). So even if there is another potential cell which is in good coverage conditions the UE will not select it.

According to some examples, this is not a problem for intra-frequency or inter-frequency reselection to equal priority layers, since ranking is based on Qmeas which does not account for Qrxlevmin.

According to the present technique, for each frequency and/or individual cell which supports enhanced coverage mode, the UE may use two priority levels, and two thresholds, and evaluates these in parallel as if these were actually two different cells/frequencies.

Obtaining Threshold and Priority Values:

Using Srxlev measurements as an example (the same will also apply to Squal):

Option 1:

As mentioned above, it's likely a new Qrxlevmin is needed to decrease the minimum cell suitability threshold. This automatically will provide an additional metric to use for comparison with the provided thresholds.

$$Srxlev = Q_{rxlevmeas} - (Q_{rxlevmin} + Q_{rxlevminoffset}) - Pcompensation$$

$$Srxlev,enhanced = Q_{rxlevmeas,enhanced} - (Q_{rxlevmin} + Q_{rxlevminoffset}) - Pcompensation$$

So the UE will always receive the existing Qrxlevmin. If the UE also receives Qrxlevmin,enhanced (the new lower minimum suitability) for the current cell or a neighbour freq/cell then this indicates that enhanced coverage is supported on the freq/cell and the UE can derive the two thresholds (rather Srxlev values) from this information.

The UE also receives a priority per wireless access interface (frequency). This can be set to any value between 0-7 and shall be used in conjunction with the existing thresholds.

The Srxlev,enhanced can use an implicit priority with a value −1 (similar to the rule used for CSG cells—the priority is considered to be lower than any of the configured priorities).

According to the present technique two thresholds and two priorities. The existing threshold and priority used for normal coverage UEs will remain the same and the behaviour does not change. The threshold using enhanced coverage may be coupled with a lower priority and be evaluated in addition to the existing priority and threshold as if it was a separate cell.

According to the present technique therefore:

The UE will not reselect a higher priority frequency which is accessible only with enhanced coverage, because that modified threshold is coupled with lower priority.

The UE camped on an enhanced coverage cells will consider all other cells as higher priority, and so will measure relatively infrequently which has the effect of saving power as well as enabling some measurements and reselections to other layers which may provide better coverage. The UE would then reselect to another enhanced coverage cell only using ranking (equal priority inter-frequency or intra-frequency reselection) and only when the level drops below the modified threshold of the current frequency.

Option 2:

According to this example, for each wireless access interface, the threshold and the priority are explicitly signalled. According to this example the mobile communications network explicitly signals additional priorities, or additional thresholds for each wireless access interface (frequency or individual cell, if some cells on a frequency support enhanced coverage and others do not). The resulting behaviour is the same, that these are evaluated in parallel (so two thresholds, and two priorities per frequency/cell).

One potential way to achieve this is to remove the restriction given in system information block type 5: "E-UTRAN does not configure more than one entry for the same physical frequency regardless of the E-ARFCN used to indicate this."

However this may cause legacy UEs to interpret that as an error, so it is likely not a useful option.

Use of Threshold and Priority Values

There are several options but the simplest would be to maintain a neighbour list (typically the UE would implement a list of neighbour frequencies and/or cells along with the specific associated information such as threshold, Qrxlevmin, priority, etc). The UE would just generate an additional entry for each neighbour cell and store the new threshold and priority parameters (so there are two entries for this cell, with two different priority/thresholds). Then cell reselection would work as normal.

Other implementations may include storing both values for threshold and priority associated with that wireless access interface (cell or frequency), and selecting the correct value. For example when performing measurement for higher priority layers (service based measurement), the original values will be used, but when doing coverage based measurement the new values could be applied after checking if the original values meet the cell reselection criteria and this failed.

Figure 7:
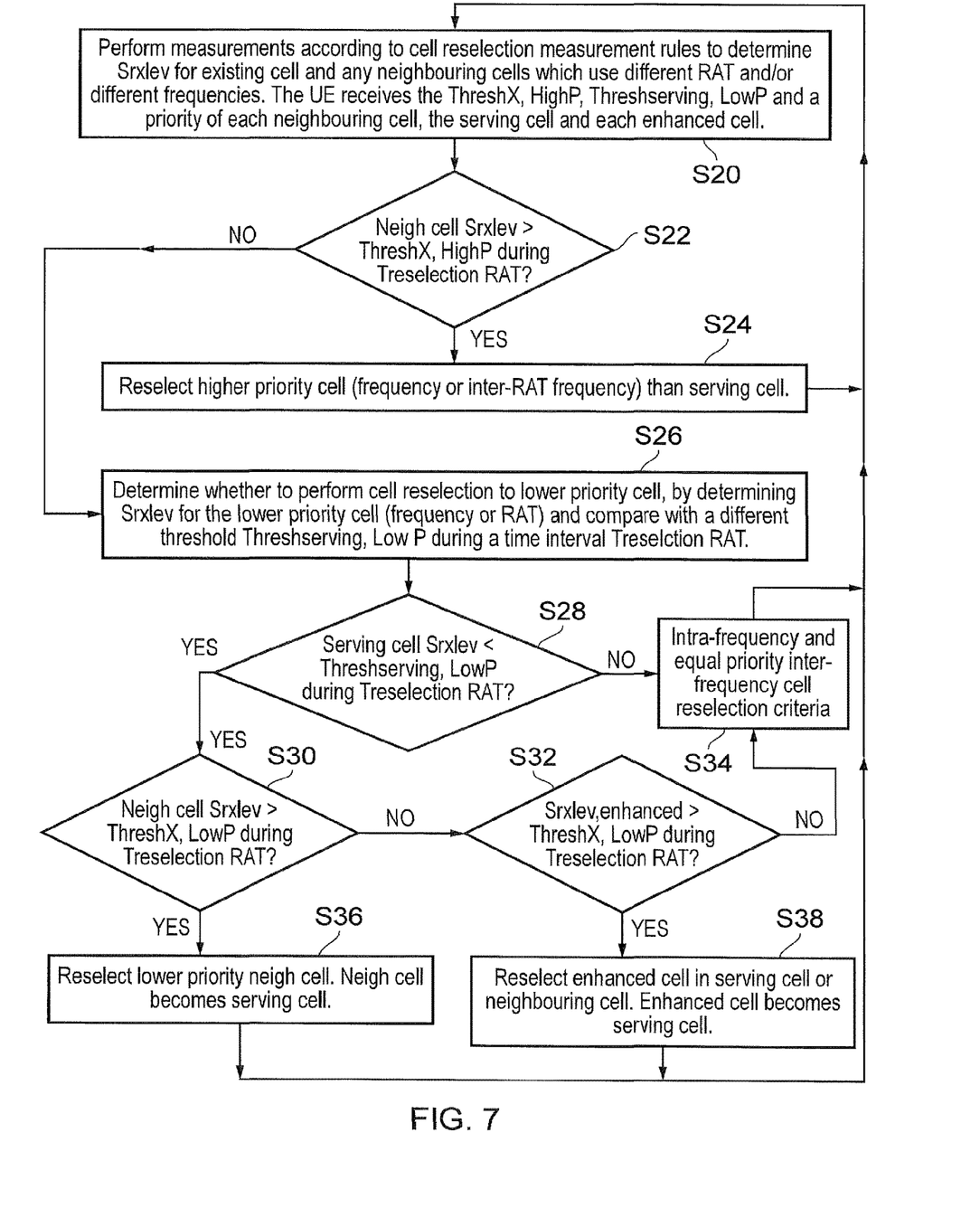
FIG. 7 provides an example flow diagram providing an illustration of a process for performing cell reselection in accordance with the present technique.

A flow diagram summarising the operation of a UE to perform the cell selection according to the present technique, which is based on the flow diagram of FIG. 6, is provided in FIG. 7. The flow diagram of FIG. 7 is summarised as follows:

S20: The UE performs measurements according to cell reselection measurement rules such as determining the parameter Srxlev and/or Squal identified above, which provides a signal reception metric for existing cells and any neighbouring cells which use different radio access technologies (RAT) and or different frequencies. In some examples the measurements are performed only for higher priority wireless access interfaces first, and then only if a higher priority wireless access interface is not selected. The UE then derives a first threshold (ThreshX,HighP) which is the threshold for changing to a higher priority base station or access point and a second threshold (Threshserving,LowP) which is associated with reselecting a lower priority wireless access interface. The UE also receives a priority level for each of the wireless access interfaces that is for the neighbouring infrastructure equipment and the serving of an infrastructure equipment.

S22: If the signal reception metric (Srxlev, Squal) is above the first threshold associated with switching to a higher priority wireless access interface then processing proceeds to step S24 otherwise processing proceeds to S26. The first threshold which is associated with switching to a higher priority in S22 is ThreshX,HighP where X=another wireless access interface for a neighbouring cell or the serving cell.

S24: If the signal reception metric (Srxlev, Squal) for a higher priority wireless access interface is above the first threshold (ThreshX,HighP) then the UE switches by reselecting the higher priority cell which becomes the new serving cell.

S26: If the signal reception metric (Srxlev, Squal) is below the first threshold (ThreshX,HighP) then the UE begins to perform measurements of any wireless access interface including neighbouring cells which have a lower priority or an equal priority. The UE therefore determines the signal reception metric (Srxlev, Squal) for lower priority cells and compares these with the second threshold for selecting the lower priority cells. The second threshold in S28 is Threshseving,LowP and so is a threshold set for the serving wireless access interface to switch to a lower priority cell.

S28: If the serving cell has a signal reception metric (Srxlev, Squal) which is below the second threshold (Threshseving,LowP) for selecting a lower priority wireless access interface then processing proceeds to S30. Otherwise the processing proceeds back to step S34.

S30: If the measured signal reception metric (Srxlev, Squal) for any other wireless access interface for a neighbouring cell is above a third threshold (ThreshX,LowP) for selecting one of the lower priority cells then processing proceeds to step S36. Otherwise processing proceeds to step S32. The third threshold is ThreshX,LowP, where X=another wireless access interface for a neighbouring cell or the serving cell.

S32: According to the present technique if one of the wireless access interfaces provided by the serving infrastructure equipment or the one or more neighbouring infrastructure equipment is an enhanced wireless access interface then, according to an example of the present technique, the relative priority for the enhanced wireless access interface is set to the lowest relative priority. Accordingly the UE will typically consider the enhanced wireless access interface after it has considered the other wireless access interfaces. Therefore if the measured signal reception metric (Srxlev, Squal) for an enhanced wireless access interface provided by the serving infrastructure equipment of one or more of the neighbouring infrastructure equipment is above the third threshold (ThreshX,LowP) for selecting one of the lower priority cells then processing proceeds to step S38, otherwise processing proceeds to step S34. As will be appreciated in an alternative representation then steps S30 and S32 could be regarded as the same step, and steps S36 and S38 could be regarded as the same step. However to illustrate the differences provided by the method of selecting or reselecting according to the present technique then step S32 is shown as a separate step with an associated separate step S38.

S34: If the wireless access interfaces are of equal priority then the UE performs a ranking of the relative order of priority of the wireless access interfaces, which is may select as explained above. Processing then proceeds to step S1.

S36: If the signal reception metric (Srxlev, Squal) is above the third threshold (ThreshX,LowP) then the UE selects the lower priority cell as its new cell and the neighbouring cell becomes a serving cell.

S38: Similarly, if the signal reception metric (Srxlev, Squal) for the enhanced wireless access interface is above the third threshold (ThreshX,LowP) then the UE selects the enhanced wireless access interface, which may be provided by the serving infrastructure equipment or one of the neighbouring infrastructure equipment as its new cell which becomes the new serving cell. As explained above, in an alternative representation steps S36 and S38 could be considered as the same step.

Figure 8:
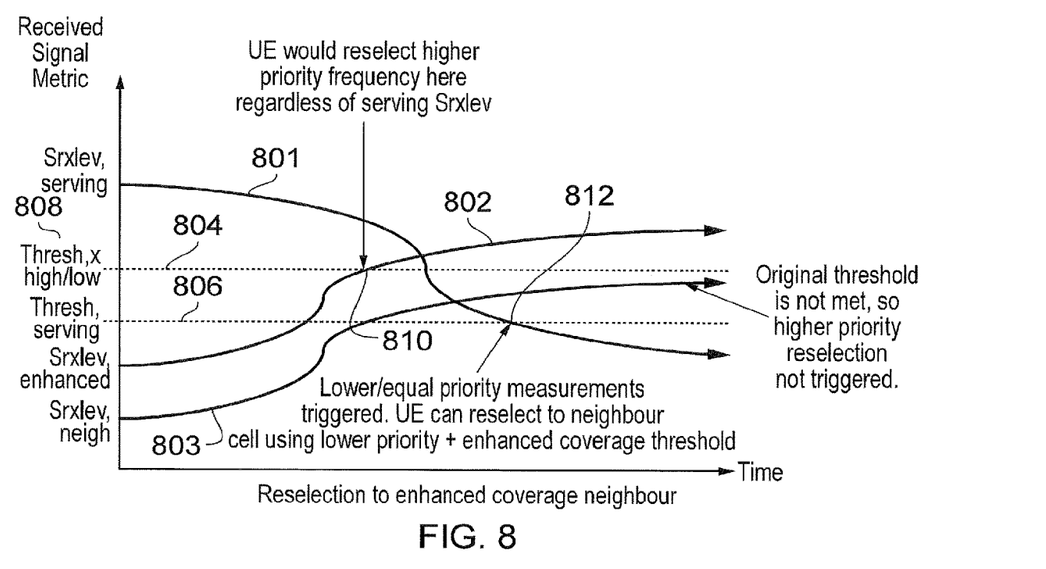
FIG. 8 provides an illustrative representation of graphical plots of signal reception metrics against time for different wireless access interfaces provided by a selected and a neighbouring infrastructure equipment, in which an enhanced wireless access interface of a neighbouring infrastructure equipment is selected.
Figure 9:
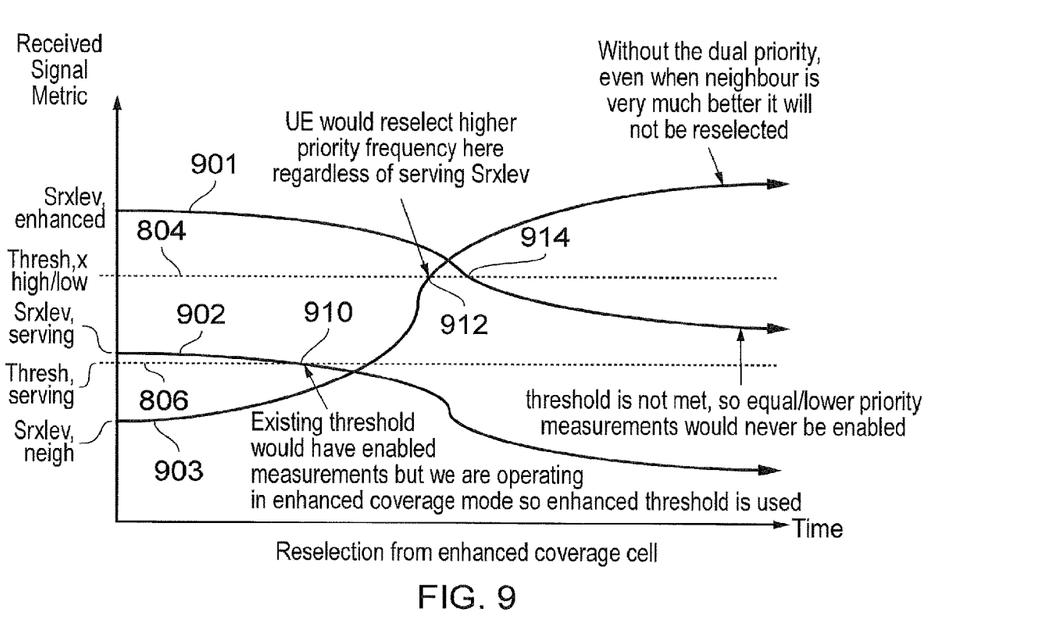
FIG. 9 provides an illustrative representation of graphical plots of signal reception metrics against time for different wireless access interfaces provided by a selected and a neighbouring infrastructure equipment, in which reselection is performed from an enhanced wireless access interface.

An illustration of the operation of the method according to the present technique is illustrated further by the example graphical representation in FIGS. 8 and 9.

FIG. 8 illustrates an operation of the UE when reselecting to an enhanced coverage neighbour cell. The graphical plots shown in FIG. 8 provide on the X-axis a representation of the signal reception metric such as the Srxlev and on the Y-axis time.

In FIG. 8, a first plot 801 is a graphical plot of a change in the signal reception metric of the current or serving wireless access interface provided by the selected or serving infrastructure equipment. A second plot 802 provides a plot of signal reception metric of an enhanced wireless access interface which may be provided by the serving infrastructure equipment or one or more of the neighbouring infrastructure equipment. A third plot 803 provides the signal reception metric from a neighbouring wireless access interface which for this example is not an enhanced wireless access interface.

Compared against each of the signal plots 801, 802, 803 is a first dashed line 804 providing a first relative threshold (ThreshX,Low/HighP). For the example showing in FIG. 8 a first dashed line 804 represents a threshold for switching to a higher priority wireless access interface. However, for this example this also represents the threshold for switching to a lower priority wireless access interface. Therefore, effectively a third threshold (Threshserving) 806 is provided which is the threshold of the serving cell to switch to a lower priority cell for wireless access interface.

As can be seen in FIG. 8, the signal reception metric for the enhanced cell is above that of the neighbouring cell 803 because of the offset which has been introduced into the signal reception metric to account for the lower signal power which is required to transmit and receive signals for an enhanced wireless access interface. As can be seen in FIG. 8, the signal reception metric crosses the threshold for other cells 804 at a point 810. Accordingly, as reflected in step S22 in the flow diagram in FIG. 7 the UE would in the case of a normal operation switch to the enhanced wireless access interface. However, in accordance with the present technique the enhanced wireless access interface is set to the lowest priority level. Accordingly, the UE does not perform measurements for this enhanced wireless access interface and therefore does not consider switching to this wireless access interface. In contrast the signal reception metric for the other wireless access interface 803 provided by a neighbouring cell never crosses the upper threshold (ThreshX, Low/HighP) and so even though this may have higher priority the UE does not switch to this cell.

At a point 812 the received signal metric of the serving wireless interface falls below the lower threshold (Threshserving) for the serving wireless interface 806. Measurements for the lower priority cells that is the enhanced wireless access interface on the serving or neighbouring cell or another wireless access interface on the neighbouring cells were triggered once the signal reception metric for higher priority cells was not exceeded (steps S22 and S26 in FIG. 7). Accordingly the UE measures the signal reception metric of the enhanced wireless access interface 802 and the wireless access interface provided by the neighbour 803.

Once the signal reception metric for the serving cell falls below the lower threshold (Threshserving) for the serving cell 806 at point 812 then the UE begins to compare the signal reception metrics for the enhanced wireless access interface and the wireless access interface provided by the neighbours 802, 803. Thus in correspondence with step S28 in FIG. 7 at point 812 then the test for whether the serving cell where signal reception metric is below the serving cell metric 806 is satisfied and processing begins at step S30 to compare the signal reception metrics for the lower priority enhanced wireless access interface and the neighbouring cell wireless access interface 802, 803. However, as can be seen in FIG. 8 the signal reception metric for the wireless access interface of the neighbouring cell 803 never exceeds the upper threshold (ThreshX,Low/HighP) 804 and so is not selected. Accordingly, step S30 is not satisfied so processing proceeds to step S32. Since at point 810 in FIG. 8 the signal reception metric 802 for the enhanced wireless access interface exceeded the upper threshold (ThreshX,Low/HighP) at point 810 then after point 812 the UE will select the enhanced wireless access interface in correspondence with steps S32 and S38 shown in FIG. 7.

FIG. 9 provides a corresponding graphical plot for another scenario in which a signal reception metric for an enhanced wireless access interface 901, a serving wireless access interface 902 and a high priority neighbouring wireless access interface 903 are plotted with respect to time. Correspondingly the higher and lower thresholds (ThreshX, Low/HighP) and Threshserving 804, 806 are shown as dash lines as they have been shown in FIG. 8. According to the present technique at point 910 the signal reception metric for the serving wireless access interface falls below the lower threshold (Threshserving) for the serving cell 806. However, at this point the signal reception metric for the higher priority neighbouring cell 903 does not exceed the upper threshold (ThreshX,Low/HighP) associated with an alternative cell 804 until point 912 and so step S22 in FIG. 7 would not be satisfied and so processing would be judged with respect to lower order priority cells from steps S26 in FIG. 7 onwards.

In contrast therefore since the signal reception metric for the serving cell falls below the lower serving threshold (Threshserving) 910 at point 910, then according to the flow shown in FIG. 7 the processing flows through steps S28 and S30 and S32 to select the enhanced wireless access interface at S38 because the signal reception metric 901 of the enhanced wireless access interface is above the upper threshold (ThreshX,Low/HighP) 804. However, at point 912 the signal reception metric for the higher priority neighbouring wireless access interface exceeds the upper threshold (ThreshX,Low/HighP) 804 and so the UE reselects the higher priority neighbouring wireless access interface. At point 914 the enhanced wireless access interface signal reception metric falls below the upper threshold (ThreshX, Low/HighP) 804. As such because the signal reception metric for the higher probability neighbouring cell 903 remains above the upper threshold (ThreshX,Low/HighP) 804 then measurements are not performed for the low or equal priority wireless access interface. Therefore the UE does not perform any further measurements unless or until the signal reception metric for the higher priority neighbouring cell falls below the lower threshold (Threshserving) 806 or another wireless access interface with higher priority exceeds the upper threshold (ThreshX,Low/HighP) 804.

SUMMARY

As explained above, it has been proposed that a UE should consider cells which need to be used in enhanced coverage mode only when the UE is in "any cell selection" state, or in other words, the UE would need to scan all supported frequencies and bands for a suitable cell, before allowing camping on a cell that would need to use enhanced coverage mode. This can be time consuming and cause excessive power drain and may unnecessarily delay the UE obtaining service, especially if several EUTRAN bands are supported. It would be beneficial if the cell selection procedure is left unchanged, so that the UE will anyway select the best cell on a frequency if it is suitable, and in order to ensure the UE does end up on the best cell (either the best enhanced coverage cell, or the best non-enhanced coverage cell) we need to ensure that cell reselection works to prioritise the cells which do not require enhanced coverage, as proposed in [2]. The cell measurement compared to suitability criteria is also a convenient way to determine which mode of operation the UE should use as observed already in [7].

According to the present technique there is provided an arrangement in which cell reselection is made with the effect of prioritising the reselection to cells which can operate without coverage enhancement over cells which require coverage enhancement, and compensating for the lower minimum suitability criteria in cell reselection. Specifically a scenario in which a UE may move from an area which can only use enhanced coverage, to an area where one cell can operate in normal coverage mode and another can operate only in enhanced coverage mode or vice versa (from normal coverage to enhanced coverage on another cell) is accommodated to bias the UE to select the normal coverage cell.

Embodiments of the present technique are therefore adapted to operate in the following scenarios:

Cell supporting enhanced coverage operation should broadcast updated suitability criteria to support cell selection in this mode of operation, and imply support of this mode of operation in the cell.

The cell measurement determines whether UE should operate in enhanced coverage mode or normal mode. If Srxlev/Squal is above Qrxlevmin/Qqual then normal operation is required. If Srxlev/Squal is below Qrxlevmin/Qqual but above Qrxlevmin,EC/Qqual,EC then enhanced coverage operation is used. If Srxlev/Squal is below both thresholds then cell is not suitable for either operation.

No further modifications to the cell selection procedure. If UE finds the best cell on a frequency is suitable because it supports enhanced coverage, then cell reselection should ensure the UE moves to a better cell if one is available.

Neighbour list signalling may be updated to indicate the updated suitability criteria of neighbouring frequencies and cells in order to support cell reselection in this mode of operation, and imply support of enhanced coverage operation in the neighbouring cell/frequency.

Furthermore embodiments of the present technique can provide the following adaptations to the operation of the UE:
1. The UE calculates two Srxlev (or Squal) values—one for normal coverage mode and another for enhanced coverage mode for any cell/frequency for which an updated Qrxlevmin,EC or Qqualmin,EC is provided (including current frequency/cell).

a. $Srxlev = Q_{rxlevmeas} - (Q_{rxlevmin} + Q_{rxlevminoffset}) - P\text{compensation}$ b. $Srxlev,EC = Q_{rxlevmeas} - (Q_{rxlevmin,EC} - Q_{rxlevminoffset})$ 2. Srxlev calculated based on the legacy Qrxlevmin is used along with the legacy configured priority for that frequency. Srxlevmin,EC calculated based on the updated Qrxlevmin,EC is used along with a low priority (lower than the 8 configured values).
3. UE evaluates the frequency (including current frequency) using both priorities and both S-values, as if these were 2 separate frequencies/cells Embodiments of the present technique can therefore provide a mobile communications system in which UEs make cell selection/reselection in which a more simple process is performed to ensure normal coverage cells are prioritised over enhanced coverage cells without impacting or reducing the impact of signalling or cell reselection criteria (hence simple UE implementation). Furthermore, enhanced coverage cells are selected only when nothing else is available, so a UE can operate as normal unless out of normal coverage.

Various further aspects and features of the present invention are defined in the appended claims.

The following numbered clauses provide further example aspects and implementations of the present technique.

REFERENCES

[1] RP-130848, "New WI:Low Cost & Enhanced Coverage MTC UE for LTE," Vodafone, published at 3GPP TSG-RAN Meeting #60, Oranjestad, Aruba, 10-14 Jun. 2013.
[2] R2-140700, "Consideration of Mobility Aspects for and MTC Enhanced Coverage Mode Operation", Vodafone Group, published at 3GPP TSG-RAN WG2 #85, Prague, Czech Republic, 10-14 Feb. 2014.
[3] R2-140327, "Cell Selection and Reselection in Coverage Enhancement", Huawei, HiSilicon, published at 3GPP TSG-RAN WG2 #85, Prague, Czech Republic, 10-14 Feb. 2014.
[4] R2-140369, "Enhanced Coverage Issues", Sony, published at 3GPP TSG-RAN WG2 #85, Prague, Czech Republic, 10-14 Feb. 2014.
[5] 3GPP TS36.304.
[6] LTE for UMTS: OFDMA and SC-FDMA Based Radio Access, Harris Holma and Antti Toskala, Wiley 2009, ISBN 978-0-470-99401-6.
[7] R2-140729, "Consideration on idle mode MTC UE in enhanced coverage", Alcatel-Lucent Shanghai Bell, Alcatel-Lucent, published at 3GPP TSG-RAN WG2 #85, Prague, Czech Republic, 10-14 Feb. 2014.

The invention claimed is:
1. A method of selecting a wireless access interface of an infrastructure equipment in a mobile communications network, the mobile communications network including a plurality of infrastructure equipment each providing one or more wireless access interfaces for a communications device, the method comprising:
   selecting, by the communications device, one of the wireless access interfaces of the infrastructure equipment as a serving wireless access interface, wherein one or more of the selected infrastructure equipment or one or more neighbouring infrastructure equipment provide an enhanced wireless access interface providing a facility for transmitting or receiving signals at a lower power relative to a wireless access interface which is not enhanced, and the selecting the one of the wireless access interfaces comprises
   generating a signal reception metric for each of the wireless access interfaces provided by the one or more neighbouring infrastructure equipment and for each of the wireless access interfaces provided by the selected infrastructure equipment, and
   selecting or reselecting one of the wireless access interfaces provided by the one or more neighbouring infrastructure equipment or one of the wireless access interfaces provided by the selected infrastructure equipment in accordance with predetermined criteria based on the generated signal reception metrics.

2. The method as claimed in claim 1, wherein each of the wireless access interfaces provided by the one or more neighbouring infrastructure equipment and each of the one or more wireless access interfaces provided by the selected infrastructure equipment has a relative priority, and the selecting the one of the wireless access interfaces provided by the one or more neighbouring infrastructure equipment or one of the wireless access interfaces provided by the selected infrastructure equipment in accordance with predetermined criteria includes
   comparing the relative priorities of each of the wireless access interfaces provided by the selected infrastructure equipment and the one or more neighbouring infrastructure equipment, and
   comparing the generated signal reception metrics for each of the wireless access interfaces provided by the selected infrastructure equipment and the one or more neighbouring infrastructure equipment, and
   selecting one of the wireless access interfaces provided by the one or more neighbouring infrastructure equipment or selected infrastructure equipment with at least one of the highest priority and the highest signal reception metric.

3. The method as claimed in claim 2, wherein the enhanced wireless access interface is assigned the lowest relative priority level.

4. The method as claimed in claim 3, wherein the selecting the one of the wireless access interfaces provided by the one or more neighbouring infrastructure equipment or the serving infrastructure equipment in accordance with predetermined criteria includes
   if one of the neighbouring infrastructure equipment provides a wireless access interface with a higher relative priority than the wireless access interface of the serving infrastructure equipment, and the signal reception metric of the higher priority wireless access interface exceeds a first predetermined threshold associated with selecting a higher priority wireless access interface, then selecting, by the communications device the higher relative priority wireless access interface, or if the signal reception metric of the serving wireless access interface is below a second predetermined threshold associated with selecting a lower priority wireless access interface, and one of the neighbouring infrastructure equipment provides a wireless access interface or an enhanced wireless access interface with a lower relative priority than the serving wireless access interface of the selected infrastructure equipment, then selecting the lower relative priority wireless access interface or enhanced wireless access interface if the signal reception metric of the lower priority wireless access interface exceeds a third predetermined threshold associated with selecting a lower priority wireless access interface or enhanced wireless access interface.

5. The method as claimed in claim 1, wherein the generating the signal reception metric for each of the wireless access interfaces, the enhanced wireless access interface and the serving wireless access interface comprises measuring a signal strength of the selected infrastructure equipment and the one or more neighbouring infrastructure equipment, or measuring a signal strength provided from each of the one or more wireless access interfaces provided from the selected infrastructure equipment and the one or more neighbouring infrastructure equipment, determining for each of the wireless access interfaces, the signal reception metric based on a difference between the measured signal strength and a predetermined minimum signal strength level associated with each of the wireless access interfaces.

6. The method as claimed in claim 5, wherein the signal reception metric for the enhanced wireless access interface provided by the selected infrastructure equipment or the one or more neighbouring infrastructure equipment is derived using a predetermined minimum signal strength level, which is lower than the predetermined minimum signal strength level for the wireless access interface provided by the selected infrastructure equipment or the one or more neighbouring infrastructure equipment which is not enhanced.

7. The method as claimed in claim 6, wherein the predetermined minimum signal strength level for the enhanced wireless access interface is lower than the predetermined minimum signal strength level for the wireless access interface provided by the selected infrastructure equipment or the one or more neighbouring infrastructure equipment by an amount which is commensurate with an amount by which the enhanced wireless access interface provided by the selected infrastructure equipment or the one or more neighbouring infrastructure equipment provides a facility for transmitting or receiving the signals at the lower power relative to the wireless access interface provided by the selected infrastructure equipment or the one or more neighbouring infrastructure equipment which is not enhanced.

8. The method as claimed in claim 5, wherein the measuring the signal strength of the selected infrastructure equipment and the one or more neighbouring infrastructure equipment, or the measuring the signal strength provided from each of the one or more wireless access interfaces provided from the selected infrastructure equipment and the one or more neighbouring infrastructure equipment, comprises if one or more of the neighbouring infrastructure equipment provides a wireless access interface with a higher relative priority than the wireless access interface of the serving infrastructure equipment, measuring the signal strength of the higher priority wireless access interfaces provided by the one or more neighbouring infrastructure equipment, and if the signal strength of the selected infrastructure equipment is below a threshold, measuring the signal strength of the lower and equal priority wireless access interfaces provided by selected infrastructure equipment or the one or more neighbouring infrastructure equipment.

9. The method as claimed in claim 1, wherein the generating the signal reception metric for each of the wireless access interfaces, the enhanced wireless access interface and the serving wireless access interface comprises measuring a signal quality of the selected infrastructure equipment and the one or more neighbouring infrastructure equipment, or measuring a signal quality provided from each of the one or more wireless access interfaces provided from the selected infrastructure equipment and the one or more neighbouring infrastructure equipment, determining for each of the wireless access interfaces, the signal reception metric based on a difference between the measured signal quality and a predetermined minimum signal quality level associated with each of the wireless access interfaces.

10. The method as claimed in claim 9, wherein the signal reception metric for the enhanced wireless access interface provided by the selected infrastructure equipment or the one or more neighbouring infrastructure equipment is derived using a predetermined minimus signal quality level, which is lower than the predetermined minimum signal quality level for the wireless access interface provided by the selected infrastructure equipment or the one or more neighbouring infrastructure equipment which is not enhanced.

11. The method as claimed in claim 10, wherein the predetermined minimum signal quality level for the enhanced wireless access interface is lower than the predetermined minimum quality level for the wireless access interface which is not enhanced provided by the selected infrastructure equipment or the one or more neighbouring infrastructure equipment by an amount which is commensurate with an amount by which the enhanced wireless access interface provided by the selected infrastructure equipment or the one or more neighbouring infrastructure equipment provides a facility for transmitting or receiving the signals at the lower power relative to the wireless access interface provided by the selected infrastructure equipment or the one or more neighbouring infrastructure equipment which is not enhanced.

12. The method as claimed in claim 9, wherein the measuring the signal quality of the selected infrastructure equipment and the one or more neighbouring infrastructure equipment, or the measuring the signal quality provided from each of the one or more wireless access interfaces provided from the selected infrastructure equipment and the one or more neighbouring infrastructure equipment comprises if one or more of the neighbouring infrastructure equipment provides a wireless access interface with a higher relative priority than the wireless access interface of the serving infrastructure equipment, measuring the signal quality of the higher priority wireless access interfaces provided by the one or more neighbouring infrastructure equipment, and if the signal quality of the selected infrastructure equipment is below a threshold, measuring the signal quality of the lower and equal priority wireless access interfaces provided by selected infrastructure equipment or the one or more neighbouring infrastructure equipment.

13. The method as claimed in claim 1, comprising receiving from the mobile communications network at the communications device the relative priority levels for each of the wireless access interfaces provided by the one or more neighbouring infrastructure equipment and the selected infrastructure equipment.

14. The method as claimed in claim 1, comprising receiving from the mobile communications network at the communications device the relative priority levels for the wireless access interfaces which are not enhanced provided by the one or more neighbouring infrastructure equipment and the selected infrastructure equipment, and assigning a lowest priority level to the enhanced wireless access interfaces provided by the one or more neighbouring infrastructure equipment and the selected infrastructure equipment.

15. The method as claimed in claim 14, wherein the lowest priority level is lower than any other of the configured priority levels.

16. The method as claimed in claim 1, comprising receiving from the mobile communications network at the communications device the first predetermined threshold associated with selecting a higher priority wireless access interface and the second and third predetermined thresholds associated with selecting a lower priority wireless access interface.

17. The method as claimed in claim 1, wherein the support of the enhanced wireless access interface of the serving infrastructure equipment or the one or more neighbouring infrastructure equipment is determined by receiving indications from the serving infrastructure equipment of whether the enhanced wireless access interface is supported.

18. The method as claimed in claim 17, wherein the indications comprise of an indication of the predetermined minimum signal strength level for the enhanced wireless access interface.

19. The method as claimed in claim 17, Wherein the indications comprise of an indication of the predetermined minimum signal quality level for the wireless access interface.

20. A communications device for transmitting data to or receiving data from a mobile communications network, the mobile communications network including infrastructure equipment, the infrastructure equipment providing a wireless access interface for transmitting signals to or receiving signals from the communications device, the communications device comprising:
a transmitter for transmitting signals representing the data via a serving wireless access interface provided by a selected infrastructure equipment to the mobile communications network,
a receiver for receiving signals representing the data via the serving wireless access interface provided by the selected infrastructure equipment,
a controller for controlling the transmitter and the receiver to select one of the wireless access interfaces of the infrastructure equipment as the serving wireless access interface, wherein one or more of the selected infrastructure equipment or one or more neighbouring infrastructure equipment provide an enhanced wireless access interface providing a facility for transmitting or receiving signals at a lower power relative to a wireless access interface which is not enhanced, and the controller is configured in combination with the transmitter and the receiver
to generate a signal reception metric for each of the wireless access interfaces provided by the one or more neighbouring infrastructure equipment and for each of the wireless access interfaces provided by the selected infrastructure equipment, and
to select or reselect one of the wireless access interfaces provided by the one or more neighbouring infrastructure equipment or one of the wireless access interfaces provided by the selected infrastructure equipment in accordance with predetermined criteria based on the generated signal reception metrics.

21. The communications device as claimed in claim 20, wherein each of the wireless access interfaces provided by the one or more neighbouring infrastructure equipment and each of the one or more wireless access interfaces provided by the selected infrastructure equipment has a relative priority, and the controller is configured in combination with the transmitter and the receiver
to compare the relative priorities of each of the wireless access interfaces provided by the selected infrastructure equipment and the one or more neighbouring infrastructure equipment, and
to compare the generated signal reception metrics for each of the wireless access interfaces provided by the selected infrastructure equipment and the one or more neighbouring infrastructure equipment, and
to select one of the wireless access interfaces provided by the one or more neighbouring infrastructure equipment or selected infrastructure equipment with at least one of the highest priority and the highest signal reception metric.

22. The communications device as claimed in claim 21, wherein the enhanced wireless access interface is assigned the lowest relative priority level.

23. The communications device as claimed in claim 22, wherein the controller is configured in combination with the transmitter and the receiver
to select the one of the wireless access interfaces provided by the one or more neighbouring infrastructure equipment or the serving infrastructure,
if one of the neighbouring infrastructure equipment provides a wireless access interface with a higher relative priority than the wireless access interface of the serving infrastructure equipment, and the signal reception metric of the higher priority wireless access interface exceeds a first predetermined threshold associated with selecting a higher priority wireless access interface, then selecting, by the communications device the higher relative priority wireless access interface, or
if the signal reception metric of the serving wireless access interface is below a second predetermined threshold associated with selecting a lower priority wireless access interface, and one of the neighbouring infrastructure equipment provides a wireless access interface or an enhanced wireless access interface with a lower relative priority than the serving wireless access interface of the selected infrastructure equipment,
then to select the lower relative priority wireless access interface or enhanced wireless access interface if the signal reception metric of the lower priority wireless access interface exceeds a third predetermined threshold associated with selecting a lower priority wireless access interface or enhanced wireless access interface.

24. The method as claimed in claim 1, wherein the enhanced wireless access interface provides a facility for transmitting or receiving signals over an extended coverage area relative to a wireless access interface which is not enhanced.

\* \* \* \* \*